June 25, 1940.  E. D. PHINNEY  2,205,434
TREATMENT OF HYDROCARBON OILS
Filed Nov. 30, 1937
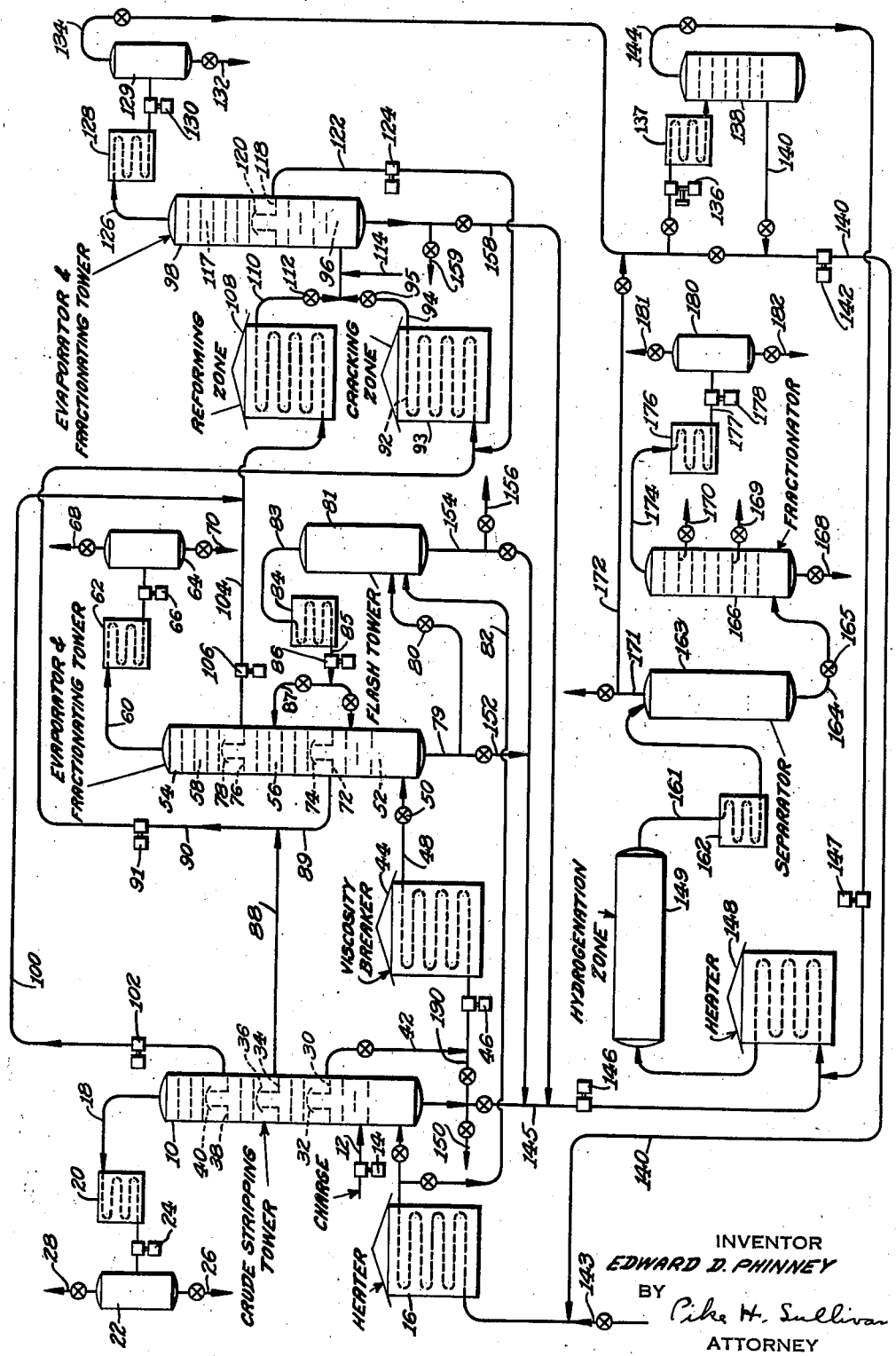
INVENTOR
*EDWARD D. PHINNEY*
BY
*Pike H. Sullivan*
ATTORNEY Patented June 25, 1940

2,205,434

UNITED STATES PATENT OFFICE 2,205,434

TREATMENT OF HYDROCARBON OILS

Edward D. Phinney, Mount Vernon, N. Y., assignor to Process Management Company Inc., a corporation of Delaware Application November 30, 1937, Serial No. 177,197

3 Claims. (Cl. 196—49)

This invention relates to improvements in the art of converting high boiling hydrocarbons into low boiling hydrocarbons.

According to my invention a heavy charging oil such as crude petroleum oil, reduced crude oil or the like is stripped by intimate and direct contact with hot pyrolyzed gases from a gas pyrolysis zone so that substantially all the vaporizable constituents are removed and only a very heavy asphaltic tar is left in liquefied form. The vapors are separated into a very heavy gas oil fraction, a lighter gas oil fraction, a heavy naphtha fraction, and a distillate containing gasoline constituents.

The very heavy gas oil is passed through a viscosity breaking zone wherein the oil is maintained under superatmospheric pressure and relatively high temperature conditions in order to obtain a relatively large yield of gas oil constituents suitable for further cracking to produce gasoline, and a relatively small yield of gasoline constituents. The products leaving the viscosity breaking zone are introduced into an evaporator or separating zone where a separation into vapors and liquid residue takes place, the vapors being fractionated to separate a gas oil fraction and a heavy naphtha fraction from a distillate containing gasoline constituents. The liquid residue or a portion thereof may be passed to a tar flash zone to further separate vapors from a liquid residue, the vapors being condensed and a part used as reflux for the vapors from the viscosity breaking zone undergoing fractionation and the rest passed to the evaporator.

The gas oil fraction derived from the heavy charging oil and the gas oil fraction separated from the vapors derived from the viscosity breaking zone are passed through a cracking zone maintained under superatmospheric pressure and high temperature conditions to effect the desired extent of cracking. The products from the cracking zone are passed to a second evaporator or separating zone for separation into vapors and a liquid residue.

The heavy naphtha fraction separated from vapors derived from the heavy charging oil and the heavy naphtha separated from vapors derived from the viscosity breaking zone are passed through a reforming and cracking zone maintained under superatmospheric pressure and high temperature conditions to effect the desired extent of cracking and reforming of the heavy naphtha. The products leaving the reforming and cracking zone are passed into the second evaporator or separating zone for separation into vapors and liquid residue. If desired, the products from the cracking zone and the products from the cracking and reforming zone may be passed into separate evaporator or separating zones.

The vapors from the second evaporator or separating zone are fractionated to separate a distillate having the desired boiling range from condensate oil, the condensate oil being recycled through the cracking zone for further cracking of the constituents thereof. The overhead vapors which are condensed to form the desired distillate also contain lighter constituents which are not condensed and which pass off as gases.

These gases are treated to separate lighter constituents such as hydrogen and methane from heavier hydrocarbon constituents such as ethane, propane, butane, etc. The heavier hydrocarbon constituents are passed through the gas pyrolysis zone wherein they are maintained under high temperature and superatmospheric pressure conditions for conversion into products containing aromatic-like constituents, the products from the gas pyrolysis zone being used to strip the heavy charging oil as above described and for enriching the straight run gasoline with anti-knock compounds.

The lighter gases containing hydrogen and methane are utilized to hydrogenate the tar residues collected during the operation of the process to produce lubricating oil, gasoline, or gas oil constituents suitable for further cracking. The tar residues which may be hydrogenated include the very heavy asphaltic tar resulting from the stripping of heavy charging oil, the tar residues from the evaporator or separating zones and the tar residue from the tar flash zone. These tars may be admixed and passed through a hydrogenation zone where they react with the hydrogen and methane separated as above described to produce suitable products, or they may be separately passed through hydrogenation zones.

Instead of pyrolyzing the hydrocarbon gases which are collected during the operation of the process or which may be supplied from an external source, it is within the contemplation of my invention to polymerize these gases and to use the resulting products to strip the heavy charging oil of its lighter constituents leaving a residual oil. In this event, however, the products will be at a lower temperature than products from a pyrolyzing operation and it may be necessary to preheat the heavy charging oil in any suitable manner before it is contacted with the products from the polymerization operation. The residual oil may be passed through the viscosity breaking zone above described in connection with the very heavy gas oil.

In the drawing I have shown a diagrammatic illustration of apparatus suitable for carrying out the process of my invention.

Referring now to the drawing the reference character 10 designates a crude stripping tower into which a heavy charging oil such as crude petroleum oil, reduced crude oil or the like is introduced by being passed through line 12 by pump 14. The heavy charging oil directly and intimately contacts products coming from a gas pyrolysis zone or coil 16 and in this way the heavy charging oil is stripped so that substantially all the vaporizable constituents of the charging oil are removed and only a very heavy asphaltic tar is left which is collected in liquefied form at the bottom of crude stripping tower 10. The charging oil and pyrolyzed gases are introduced into the bottom portion of the stripping tower 10. The gas pyrolysis operation will be later described in more detail.

The vapors resulting from the stripping action are separated into a plurality of fractions including a very heavy gas oil, a lighter gas oil fraction, a heavy naphtha fraction and light overhead vapors which contain gasoline constituents and anti-knock compounds and which pass through line 18 and then through condenser 20, the distillate being passed to the receiver 22 by pump 24. The receiver 22 is provided with a valved liquid outlet 26 and a valved gas outlet 28.

The crude stripping tower 10 is provided with a trapout tray 30 having a hood 32 for collecting the very heavy gas oil, a trapout tray 34 having a hood 36 for collecting the lighter gas oil fraction and trapout tray 38 having a hood 40 for collecting the heavy naphtha fraction.

The very heavy gas oil collecting on trapout tray 30 is withdrawn through line 42 and passed through a viscosity breaking zone or coil 44 by pump 46. In this viscosity breaking zone or coil the heavy oil is subjected to superatmospheric pressure and a relatively high temperature for a time limited to produce a relatively large amount of intermediate constituents suitable for further cracking under more drastic conditions to produce gasoline. During the treatment of the heavy oil in the viscosity breaking zone or coil 44 gasoline constituents are also obtained. The products resulting from the viscosity breaking treatment are passed through line 48 preferably having a pressure reducing valve 50 into the evaporator or separating zone 52 of the combined evaporator and fractionating tower 54 wherein a separation into vapors and liquid residue occurs.

The vapors are fractionated in the fractionating sections 56 and 58 of the combined evaporator and fractionating tower 54 to separate a gas oil fraction suitable for further cracking to produce gasoline constituents and a heavy naphtha fraction from light overhead vapors which are passed through line 60 and then through condenser 62, the distillate being passed to the receiver 64 by pump 66. The receiver 64 is provided with a valved gas outlet 68 and a valved liquid outlet 70. The combined evaporator and fractionating tower 54 is provided with a trapout tray 72 having a hood 74 for collecting the gas oil fraction and a trapout tray 76 having a hood 78 for collecting the heavy naphtha fraction.

The liquid residue or a portion thereof may be withdrawn from the evaporator or separating zone 52 and passed through line 79 having a pressure reducing valve 80 into a tar flash tower 81 to further separate vapors from a liquid residue. Some of the pyrolyzed gases from the pyrolysis zone or coil 16 may be diverted through line 82 and introduced into the tar flash tower to further strip the liquid residue therein. The vapors leave the top of the flash tower 81 through line 83 and are passed through condenser 84, the distillate being passed through line 85 by pump 86 into the evaporator and separating zone 52 and through line 87 into the fractionating section 56 as reflux or all the distillate may be passed through one of the lines to the exclusion of the other.

The gas oil fraction separated from vapors derived from the heavy charging oil and collecting on trapout tray 34 is withdrawn therefrom through line 88 and the gas oil fraction separated from vapors derived from the viscosity broken products and collecting on trapout tray 72 is withdrawn through line 89. These gas oil fractions are preferably admixed and passed through line 90 by pump 91 and then through a cracking zone or coil 92 in furnace 93 wherein the oil is subjected to high cracking per pass conditions to make high anti-knock gasoline. The products from the cracking zone or coil 92 are passed through line 94 having a pressure reducing valve 95 into the second evaporator or separating zone 96 of the combined evaporator and fractionating tower 98 wherein a separation into vapors and liquid residue occurs.

The heavy naphtha fraction separated from vapors derived from the heavy charging oil and collecting on trapout tray 38 in the crude stripping tower 10 is withdrawn therefrom and passed through line 100 by pump 102 and is admixed with the heavy naphtha fraction separated from vapors derived from the viscosity broken products, the latter heavy naphtha fraction being withdrawn from trapout tray 76 in the combined evaporator and fractionating tower 54 and passed through line 104 by pump 106. The combined stream is passed through a cracking and reforming zone or coil 108 wherein it is subjected to superatmospheric pressure and high temperature conditions to effect the desired extent of cracking and reforming of the heavy naphtha fractions. The products from the cracking and reforming zone 108 are passed through line 110 having a pressure reducing valve 112 into the separating zone 96 of the combined evaporator and fractionating tower 98 wherein a separation into vapors and liquid residue occurs. Before being introduced into the evaporator or separating zone 96, the products from the cracking zone 92 and the cracking and reforming zone 108 may be quenched with an oil passing through line 114.

The vapors separated in the second evaporator 96 are fractionated in fractionating section 117 of the combined evaporator and fractionating tower 98 to separate light vapors from condensate oil which is collected on trapout tray 118 having a hood 120. The condensate oil is preferably withdrawn from trapout tray 118 and passed through line 122 by pump 124 for recycling through the cracking zone or coil 92. The vapors passing overhead are conducted through line 126 and condenser 128 and the distillate passed to receiver 129 by pump 130. In the receiver 129 vapors and gases are separated from liquid. The liquid which is a light motor fuel such as gasoline is withdrawn through valved line 132.

The gases and vapors separated in the distillate receiver 129 are further treated to separate hydrogen and methane therefrom by subjecting the gases and vapors, for example, to low temperature fractionation. Other methods of separating such gases known in prior practices may be used. The gases and vapors may be passed through line 134 and compressed by compressor 136 to liquefy heavier portions thereof and cooled by condenser 137 and then passed to the low temperature fractionating tower 138 held under pressure to separate light gases containing hydrogen and methane from heavier hydrocarbon gases containing ethane and heavier constituents. The heavier hydrocarbon fraction is withdrawn from fractionator 138 and passed through line 140 by pump 142 and through the gas pyrolysis zone or coil 16 wherein the gases are subjected to high temperature and relatively low superatmospheric pressure conditions to crack them and form gaseous unsaturated compounds and normally liquid aromatic compounds including benzol which latter compounds are valuable as anti-knock constituents and which pass overhead with gasoline constituents leaving the top of crude stripping tower 10 when the hot pyrolyzed gases are introduced into tower 10. The hot pyrolyzed gases are passed into the crude stripping tower 10 for stripping the heavy charging oil as above described. If desired, gas from an external source may be passed through line 143 and added to the gas passing through line 140.

The light gases separated in the fractionator 138 and which contain hydrogen and methane after having preferably been passed through a scrubbing tower to remove impurities are passed through line 144 and are used to hydrogenate and react with the tar residues obtained during the operation of the process. The heavy asphaltic residue remaining after stripping the heavy oil in stripping tower 10 is withdrawn from the bottom thereof and passed through line 145 by pump 146 and is mixed with the light gases passed through line 144 by pump 147. This mixture is passed through a heating coil 148 wherein it is maintained under high temperature and high pressure conditions. The mixture is then passed to a hydrogenating zone 149 where it contacts a suitable catalyst under pressure to hydrogenate the heavy or asphaltic residue. A portion of the heavy residue may be withdrawn from the system through line 150.

As above described, a portion or all of the tar residue withdrawn through line 79 from the bottom of the combined evaporator and fractionating tower 52, may be passed to the tar flash tower 81. The rest of the tar residue may be passed through line 152 and combined with the heavy residue withdrawn from the bottom of the stripping tower 10 and further treated as will be presently described. The tar residue collecting on the bottom of the tar flash tower 81 is withdrawn therefrom through line 154 and may be combined with the other tar residues. A portion of this tar residue may be withdrawn from the system through line 156. The liquid residue from the bottom of the second evaporator or separating zone 96 of the second combined evaporator and fractionating tower 98 is withdrawn through line 158 and may be combined with the other tar residues for further treatment. A portion of the tar residue may be withdrawn from the system through line 159.

The tar residues are mixed with the light gases passing through line 144 and the mixture is passed through the heated coil 148 to raise the temperature of the mixture to a relatively high temperature and then passed through the hydrogenation zone 149 where it contacts with a suitable catalyst to hydrogenate the tar residues as above described. The reaction products leave the hydrogenation zone through line 161 and condenser 162 and the cooled and condensed products are passed to a separating zone 163 under the system pressure to separate liquid from gases. The liquid is withdrawn through line 164 having a pressure reducing valve 165 into a fractionating tower 166 wherein the liquid is fractionated into the desired fractions, the heaviest oil constituents such as a lubricating oil being withdrawn through line 168. Side cuts may be taken from the fractionating tower 166, such as a gas oil fraction through line 169 suitable for further cracking in cracking zone 92 for the production of gasoline and a heavy naphtha fraction through line 170 suitable for further cracking in reforming zone 108. The gases from the separator 163 are passed overhead through line 171 and a portion sent to storage or all the gases may be passed through line 172 and combined with the gases from the receiver 129 and the mixture passed to the fractionating separator 138.

The vapors leave the top of the fractionating tower 166 through line 174 and are condensed by being passed through condenser 176, the distillate being passed through line 177 by pump 178 and into a receiver 180. The receiver 180 is provided with a valved gas outlet 181 and a valved liquid outlet 182 through which a light motor fuel such as a gasoline may be withdrawn. The various liquid residues may be separately treated if desired. The hydrogenating conditions may be varied within limits.

In some instances, instead of pyrolyzing a gas mixture containing the heavier hydrocarbon gases in the pyrolysis zone 16, I may polymerize the gas mixture by passing it through a heated coil or zone to form normally liquid hydrocarbons containing gasoline constituents. The polymerization takes place at higher pressure and at a lower temperature (at about 750 to 1200° F. and at about 400 to 3000 pounds per square inch) than the pyrolysis and therefore it may be necessary to preheat the heavy charging oil before it is introduced into the crude stripping tower 10. The reaction products from the polymerization treatment are introduced into the stripping tower 10 wherein they contact the introduced heavy charging oil. A portion of the heavy charging oil will be vaporized and the residual oil which collects on the bottom of the stripping tower is withdrawn through line 145 and passed through line 190 into viscosity breaking zone 44 wherein it is maintained under superatmospheric pressure and elevated temperature for the desired time to produce a relatively large yield of gas oil constituents suitable for further cracking to produce gasoline. When using residual oil from the bottom of the tower 10 no side cut is withdrawn from trapout tray 30 and this tray may be omitted; and no tar or asphalt residue is obtained from the bottom of stripping tower 10 as in the case where hot pyrolyzed gases are used.

A typical operation contemplated by my invention will now be given but it is to be understood that I am not restricted thereto. The heavier hydrocarbon fraction containing ethane, propane, butane, etc., separated in the low temperature fractionator 138 is passed through the pyrolysis zone or coil 16 wherein it is subjected to a pressure of about atmospheric to 200 pounds per square inch and raised to a temperature of about 1200 to 1750° F. to effect the desired extent of cracking thereof. In this pyrolysis the hydrocarbon gases are converted into gaseous unsaturated compounds and normally liquid aromatic compounds including valuable antiknock constituents. The reaction products leave the pyrolysis zone or coil at a high temperature and are passed into the stripping tower 10 wherein they contact the introduced heavy charging oil which preferably is crude petroleum oil. The crude stripping tower 10 may be maintained at a pressure of about atmospheric to 200 pounds per square inch. Substantially all of the introduced heavy oil is vaporized so that only a very heavy asphaltic residue is left. When using a Mid Continent crude oil having an A. P. I. gravity of 35°, the asphaltic residue has an A. P. I. gravity of about 10° to 15°, for example, 12°. The reaction products from the pyrolysis zone or coil 16 also have a steam stripping effect on the introduced heavy oil charge.

The vaporized heavy charging oil is separated into liquid fractions and a light distillate in the stripping tower 10, the fractions being collected on trapout trays 30, 34 and 38 and the light distillate being collected in receiver 22. The light distillate contains light aromatic compounds resulting from the gas pyrolysis and may be mixed with the final distillate withdrawn from receiver 129, or may be used, for example, as a blending stock with other fuels. The very heavy gas oil which collects on trapout tray 30 consists essentially of constituents boiling above 650 to 750° F. and is passed through the viscosity breaking zone 44 wherein it is maintained under a pressure of about 100 to 500 pounds per square inch and at a temperature of about 850 to 950° F. for a time limited to produce a relatively large yield of lighter gas oil constituents which are suitable for further cracking to produce gasoline.

The products leave the viscosity breaking zone 44 at a temperature, for example, of about 880° F. and at a pressure of about 200 pounds per square inch and are passed to the evaporator or separating zone 52 which is maintained under a pressure of about 10 to 200 pounds per square inch and the products are separated into a liquid residue and vapors. The vapors are further fractionated in the fractionating sections 56 and 58 of the combined evaporator and fractionating tower 54 to separate a gas oil fraction which has an end point of about 650 to 750° F. and a heavy naphtha fraction which has an initial boiling point of about 200 to 300° F. and an end point of about 400 to 500° F. from light overhead vapors.

The gas oil separated from vapors derived from the viscosity broken products collects on trapout tray 72 and is withdrawn therefrom and is mixed with the gas oil withdrawn from tray 34 which is separated from the vapors derived from the heavy charging oil and which has about the same initial boiling point as the gas oil from tray 72. The mixture of gas oils is passed through line 90 and through the cracking zone or coil 92 wherein it is maintained under a pressure of about 500 to 1000 pounds per square inch and at a temperature of about 850 to 1000° F. to effect the desired extent of cracking of the gas oil constituents to produce the maximum yield of gasoline constituents. The stream of cracked products from the cracking zone or coil 92 is passed through the second evaporator or separating zone 96 which is maintained under a pressure of about 100 to 200 pounds per square inch. In the evaporator or separating zone 96 there is a separation of the cracked products into vapors and liquid residue.

The heavy naphtha fraction separated from vapors derived from the viscosity broken products and the heavy naphtha fraction separated from vapors derived from the heavy charging oil and having about the same boiling ranges are admixed and passed through the reforming zone or coil 108 wherein they are maintained under a pressure of about 200 to 1000 pounds per square inch and at a temperature of about 950 to 1150° F. The stream of reformed and cracked products is passed to the second evaporator or separating zone 96 wherein they are separated into vapors and cracked residue. The vapors derived from products from the cracking zones 92 and 108 are fractionated to separate a light distillate having the desired end point which is collected in receiver 129. Vapors leave the receiver 129 through line 134. These vapors are then compressed and cooled to liquefy some of the gases and vapors, and the liquefied mixture is passed to the low temperature fractionating zone 138 to separate light gases such as hydrogen and methane from heavy hydrocarbon gases such as ethane, propane, butane, etc. The heavy hydrocarbon gases are passed through the pyrolysis zone 16 where they are pyrolyzed as above described.

The light gases which contain hydrogen and methane are mixed with the heavy asphaltic residue withdrawn from the bottom of the stripping tower 10, and the tar residues withdrawn from the bottoms of the evaporator or separating zone 52, tar flash tower 81 and the second evaporator or separating zone 96. The mixture of hydrogen and tar and asphaltic residues is heated to a temperature of about 700 to 850° F. in heating coil 148 and passed through the hydrogenation zone 149 wherein the mixture is maintained under a pressure of about 3000 to 3600 pounds per square inch and at a temperature of about 750 to 1000° F. in the presence of a suitable hydrogenating catalyst such as sulfides of molybdenum, chromium or tungsten or mixtures thereof to effect the desired extent of hydrogenating. The products leaving the hydrogenation zone 149 are cooled and passed through the separating zone 163 to separate gases and vapors from liquid. The liquid is fractionated in the fractionating tower 166 under lower pressure to separate desired fractions. Gases leaving the top of separator 163 may be mixed with gases leaving the top of the receiver 129 for passage through fractionating separator 138.

While I have described examples of my invention, it is to be expressly understood that my invention is not restricted thereto, and various modifications and adaptations thereof may be made without departing from the spirit of my invention.

I claim:

1. A method of converting higher boiling hydrocarbons into lower boiling hydrocarbons which comprises intimately contacting a heavy petroleum charging stock with hot pyrolyzed gases introduced into the bottom portion of a stripping zone to separate vaporizable constituents in the heavy oil from a heavy asphaltic residue, fractionating the vapors in said stripping zone to separate fractions comprising heavy gas oil, light gas oil and heavy naphtha, passing heavy gas oil so obtained through a viscosity breaking zone wherein it is subjected to viscosity breaking conditions of temperature and pressure to effect conversion into a high yield of lower boiling gas oil constituents suitable for further cracking to produce gasoline constituents, separating the products from the viscosity breaking zone into vapors and liquid residue, fractionating the vapors in a separate fractionating zone to separate a light gas oil from a heavy naphtha fraction, combining the light gas oils and passing the mixture through a gas oil cracking zone wherein the mixture is maintained at cracking conditions of temperature and pressure to effect conversion into gasoline constituents, passing the resultant cracked products to a separating zone to separate vapors from liquid residue, combining the heavy naphtha fractions and passing such mixture through a reforming zone wherein the mixture is maintained under cracking conditions of temperature and pressure adequate to effect the reforming of the gasoline constituents, passing the resultant cracked and reformed products to said separating zone to separate vapors from residue, fractionating the vapors from said separating zone to form a gaseous fraction, a light distillate having the desired boiling range and a higher boiling condensate oil, directing said condensate oil to said gas oil cracking zone, treating said gaseous fraction to separate light gases containing hydrogen from heavier hydrocarbons comprising ethane, propane and butane, subjecting said heavier hydrocarbons to high temperature and superatmospheric pressure conditions to pyrolyze them and directing the resultant hot pyrolyzed gases into said stripping zone for intimately contacting the heavy petroleum charging stock therein.

2. A method of converting higher boiling hydrocarbons into lower boiling hydrocarbons which comprises intimately contacting a heavy petroleum charging stock with hot pyrolyzed gases introduced into a stripping zone to separate vaporizable constituents in the heavy oil from a heavy residue, fractionating the vapors in said stripping zone to separate fractions comprising heavy gas oil and light gas oil, passing resultant heavy gas oil to a viscosity-breaking zone wherein it is subjected to viscosity-breaking conditions of temperature and pressure to effect conversion into a high yield of lower boiling gas oil constituents suitable for further cracking to produce gasoline constituents, separating the products from the viscosity-breaking zone into vapors and residue, fractionating the vapors in a separate fractionating zone to separate out a fraction comprising light gas oil, combining said light gas oil fractions and passing the mixture through a gas oil cracking zone wherein the mixture is maintained at cracking conditions of temperature and pressure to effect conversion into gasoline constituents, passing the resultant cracked products to a separating zone to separate vapors from liquid residue, fractionating the vapors from said separating zone to form a gaseous fraction, a light distillate having the desired boiling range and a higher boiling condensate oil, directing said condensate oil to said gas oil cracking zone, treating said gaseous fraction to separate light gases containing hydrogen from heavier hydrocarbons comprising ethane, propane and butane, subjecting said heavier hydrocarbons to high temperature and superatmospheric pressure conditions to pyrolyze them and directing the resultant hot pyrolyzed gases into said stripping zone for intimately contacting the heavy petroleum charging stock therein.

3. A method of converting higher boiling hydrocarbons into lower boiling hydrocarbons which comprises intimately contacting a heavy petroleum charging stock with hot pyrolyzed gases introduced into a stripping zone to separate vaporizable constituents in the heavy oil from a heavy residue, fractionating the vapors in said stripping zone to separate fractions comprising heavy gas oil and light gas oil, passing resultant heavy gas oil to a viscosity-breaking zone wherein it is subjected to viscosity-breaking conditions of temperature and pressure to effect conversion into a high yield of lower boiling gas oil constituents suitable for further cracking to produce gasoline constituents, separating the products from the viscosity-breaking zone into vapors and residue, fractionating the vapors in a separate fractionating zone to separate out a fraction comprising light gas oil, combining said light gas oil fractions and passing the mixture through a gas oil cracking zone wherein the mixture is maintained at cracking conditions of temperature and pressure to effect conversion into gasoline constituents, passing the resultant cracked products to a separating zone to separate vapors from liquid residue, fractionating the vapors from said separating zone to separate a gaseous fraction and a light distillate having the desired boiling range from higher boiling hydrocarbons, treating said gaseous fraction to separate light gases containing hydrogen from heavier hydrocarbons comprising ethane, propane and butane, subjecting said heavier hydrocarbons to high temperature and superatmospheric pressure conditions to pyrolyze them and directing the resultant hot pyrolyzed gases into said stripping zone for intimately contacting the heavy petroleum charging stock therein.

EDWARD D. PHINNEY.